Dec. 4, 1945.  F. W. ADAMS  2,390,045
METHOD OF MAKING COMPOSITE SIDING AND ROOFING
Original Filed Dec. 25, 1938
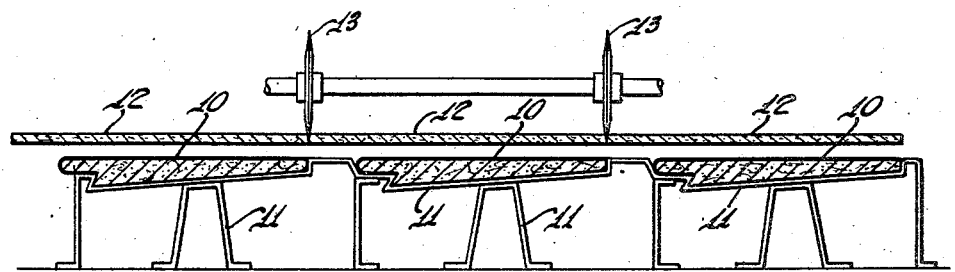
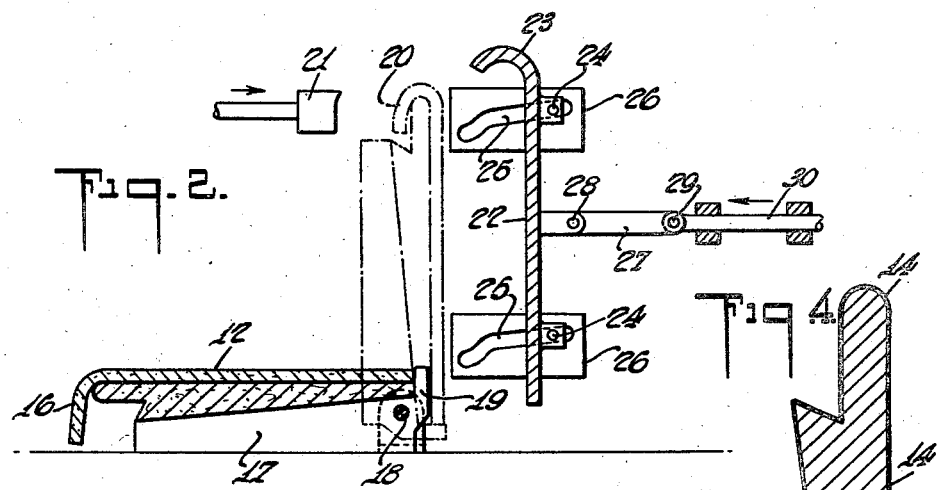
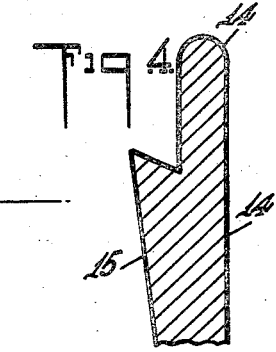
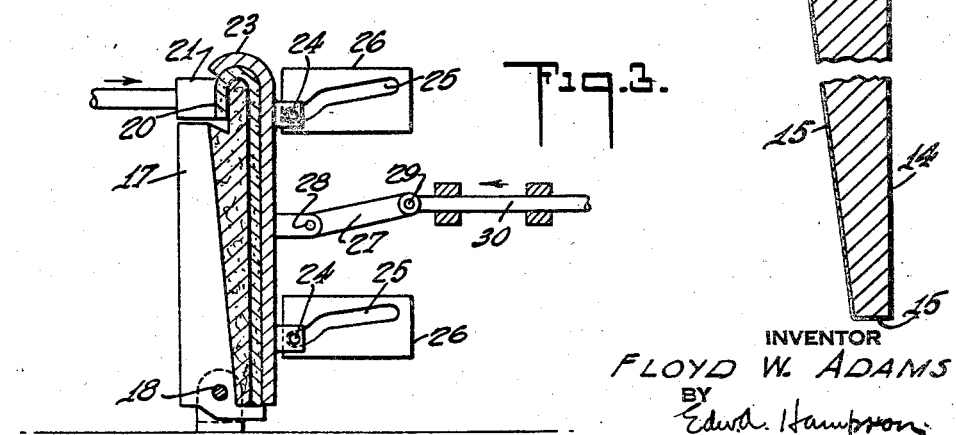
INVENTOR
FLOYD W. ADAMS
BY
Edwd. Hampson
ATTORNEY Patented Dec. 4, 1945

2,390,045

UNITED STATES PATENT OFFICE 2,390,045

METHOD OF MAKING COMPOSITE SIDING AND ROOFING

Floyd W. Adams, Huntington Park, Calif., assignor to The Celotex Corporation, Chicago, Ill., a corporation of Delaware Original application August 25, 1938, Serial No. 226,695, now Patent No. 2,251,622, dated August 5, 1941. Divided and this application March 21, 1941, Serial No. 384,608

2 Claims. (Cl. 154—2)

This invention relates to a novel method and apparatus for manufacturing a new and improved siding or roofing product which incorporates in its construction insulation against the transmission of heat therethrough and provides a roofing or siding which is of pleasing appearance, has long life and which has many other advantages over roofing or siding such as are now available, and this application is a division of Patent No. 2,251,622, patented August 5, 1941, for Composite siding and roofing.

Briefly, roofing or siding as herein disclosed comprise core portions of fiber insulating board with the portions thereof which are to be exposed covered with an asbestos-cement sheet and providing a new and improved product.

It is a particular object of this invention to provide a new and improved form of roofing or siding which has the feature of affording resistance to passage of heat therethrough which is of rugged construction but which nevertheless is economical to manufacture. It is still further the object of this invention to provide a product as described, the surface of which is fireproof, which will be long lived, which will be rigid, and which will have many other and further advantages as will be apparent from a consideration of the following specifications. Still further, it is an object of this invention to provide a method for the economical manufacture of the roofing or siding product hereof but yet a such process of manufacture which is simple in operation.

In the drawing accompanying this specification:

Figure 1 is a diagrammatical illustration of a portion of the process of manufacture of the roofing or siding hereof with parts of the drawing in section;

Figure 2 is a schematic view of a step in the manufacture of the products hereof with parts shown in section;

Figure 3 is a further schematic view of a still further step in the production of the products hereof with parts thereof shown in section; and, Figure 4 is a sectional view of the siding member at an intermediate stage of manufacture.

In the drawing accompanying this specification, in the various figures, like numerals will be used to designate like parts.

In the manufacture of the roofing or siding units of this invention there may be prepared suitable fiber insulating board blanks which are shown at 10 in Figure 1 as mounted in a supporting frame work or jig indicated generally at 11, the details of which jig are unimportant excepting that the jig shall be so formed as to properly support the blanks 10 in the desired spaced relation with their upper faces in a horizontal plane.

In the drawing there is indicated at 12 a formed asbestos-cement sheet, the manufacture of which is readily apparent to those skilled in the art, which step is not of the essence of the inventions hereof. The asbestos-cement sheet 12 as illustrated is a wet sheet taken off the sheet-forming machine and as such is quite soft and susceptible to formation as desired within reasonable limits. The wet asbestos-cement sheet is for application to the upper horizontal surface of the blanks 10 supported in suitable jig 11 and as the wet sheet is about to be laid on the surfaces of the blanks 10, the wet sheet is divided as illustrated into three parts by rotating knives 13 which sever the sheet 12 so that a separate sheet of the wet asbestos-cement composition is laid on each roofing blank 10. It is to be understood that the asbestos-cement sheet may be initially formed of a wet sheet for a single roofing blank or as illustrated it may be formed to cover a plurality of roofing blanks and be cut as it is being applied according to the foregoing description.

The roofing blanks 10 will have had applied to their top surfaces before being put into position, for receiving the asbestos-cement sheet 12 to be applied thereto, a surface coating of a suitable waterproof adhesive which coating will extend around the rounded butt and down around the underside to the base of the rabbet therein. This adhesive coating indicated at 14 is applied so that the wet asbestos-cement material may be adhered thereto and if desired or if deemed advisable, the entire blank may have been or the remainder of the blank may be suitably coated with a waterproofing, as for example, with a thin coating of asphalt which is indicated at 15.

Now considering a single blank 10 in its jig 11 with a severed sheet 12 of the asbestos-cement composition laying on the top surface thereof it will be apparent that when the roofing blank is lifted from the jig that a portion of the asbestos-cement sheet will overhang the edge at the butt thereof and will tend to sag downwardly as more clearly shown in Figure 2 at 16. The roofing blank with its wet asbestos-cement sheet thereon as described, it is now conveyed to a suitable jig 17 which may be pivoted at 18 and has a stop portion 19 to position the unit on the jig. The unit will preferably be placed on the jig in a horizontal position and then turned through the angle of 90 degrees to a vertical position whereupon there is a tendency for the overhanging portion of the asbestos-cement sheet to further droop or fold over the rounded butt end of blank 10 to take the position approximately as indicated at 20.

Considering a unit 10 with its surfacing sheet to be in the vertical position as indicated in dotted lines in Figure 2, it is apparent that if suitable pressing means are brought thereagainst that the wet sheet 12 thereon may be firmly pressed into the adhesive 14 and that the wet sheet 12 may be caused to closely adhere to the surface of the blank 10.

In order that the wet sheet 12 may be suitably pressed onto blank 10 there are provided several pressing members, one of which 21 is adapted to be moved up against the overhanging portion 20 of the wet sheet 12 to firmly press this portion 20 into the adhesive 14 which is on the underside of the roofing blank between the rounded butt end and the base of the rabbet therein. A further pressing member 22 is provided which has a flat portion and an upper rounded portion indicated at 23, this pressing member 22 being provided with pins 24 extending therefrom adapted to operate in cam slots 25 in suitably mounted cam plates 26. Provision is made through a link 27 pivoted at 28 to the pressing member 22 whereby through pivoted connection 29 a plunger 30 may move the pressing member 22 toward and from the roofing blank.

In the actual shaping of the wet sheet 12 on the roofing blank 10 and to secure firm adhesion of the asbestos-cement sheet to the adhesive 14 on blank 10 the several pressing members 21 and 22 are advanced into contact with the wet sheet 12 and it will be seen that the pressing member 21 will press the portion 20 of sheet 12 firmly into the adhesive on the underside of the roofing blank 10 and that pressing member 22 will as it approaches have a composite motion due to the operation of pins 24 in slots 25 so that in the last portion of the forward stroke of pressing member 22 it will move downwardly as well as forwardly so that not only will the flat portion 22 press against the flat portion of the wet sheet 12 but in addition the rounded end 23 will come down against and press that portion of wet sheet 12 which extends around the rounded butt of roofing butt 10.

In accordance with the foregoing, it will be readily apparent that by subjecting the blank 10 with its wet asbestos-cement sheet thereon to pressing as above described that the entire wet sheet may be firmly pressed into the adhesive 14 on the blank 10 and brought into intimate contact therewith, adhered by the adhesive 14.

The pressed roofing unit core 10 and adhered sheet 12 will now be removed from the jig 17 after the several pressing members 21 and 22 have been retracted and the surfaced blank 10 may then be suitably dried and cured to produce the new and improved product hereof.

In accordance with the foregoing, it will be seen that there has been described a new and improved form of roofing unit which has many advantages over roofing which has heretofore been known and that there has been described a simple method of fabricating these roofing units although both the product and the method of manufacture are susceptible to modification as will be readily apparent to those skilled in the art to which the inventions hereof appertain.

The inventions hereof having been fully described, I claim:

1. The method of manufacturing a composite siding and roofing unit, comprising the steps; forming a body blank with a rounded butt, forming an unset felted asbestos cement sheet, applying the unset asbestos cement sheet to a face of the body blank while the body blank is supported in substantially horizontal position and with a portion of such sheet extending outwardly beyond the butt edge of the blank, moving the assemblage toward a vertical position, the position of the assemblage being otherwise maintained with the unset asbestos cement sheet uppermost whereby under the action of gravity the projection of such sheet tends to wrap around the rounded butt, the step of pressing the sheet firmly into contact with the surface of the body blank around the butt thereof and with a portion of the body blank adjacent the butt edge, thereby causing the felted asbestos cement sheet to be affixed to the body blank and finally causing the asbestos cement sheet to set.

2. The method of manufacturing a composite siding and roofing unit, comprising the steps: forming a body blank with a rounded butt, applying adhesive to a face of the body blank and to the rounded butt portion thereof, forming an unset felted asbestos cement sheet, with the body of the blank supported in a substantially horizontal position, and with the adhesively coated face of the body blank facing upwardly applying the unset asbestos cement sheet to the upwardly facing adhesive-coated face of the body blank and with a portion of such sheet extending outwardly beyond the butt edge of the blank, by a substantially pivoting about the head edge of the blank moving the assemblage toward a vertical position, the position of the assemblage being otherwise maintained with the unset asbestos cement sheet uppermost whereby under the action of gravity the projection of such sheet tends to wrap around the rounded butt, moving pressing means into pressing relation to the applied unset felted asbestos cement sheet, pressing the sheet firmly into contact with the surface of the body blank, around the butt thereof and with a portion of the body blank adjacent the butt edge, thereby causing the felted asbestos cement sheet to be affixed to the body blank and finally causing the asbestos cement sheet to set.

FLOYD W. ADAMS.